May 5, 1959  J. R. MONKS, JR., ET AL  2,884,744
APPARATUS FOR CONDITIONING MOLTEN GLASS
Filed Feb. 23, 1956
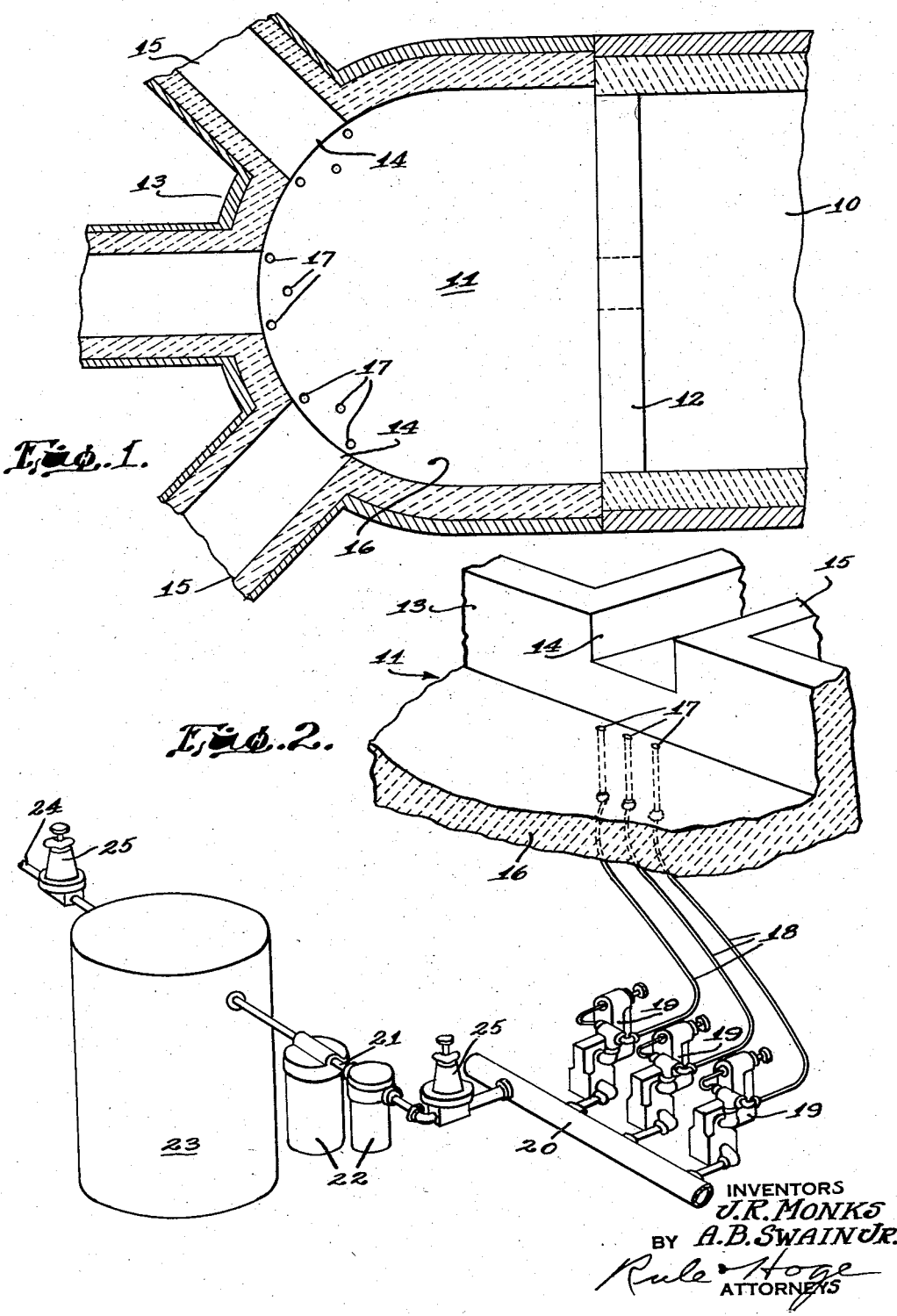
INVENTORS
J.R. MONKS
A.B. SWAIN JR.
BY
Rule Hoge
ATTORNEYS

United States Patent Office 2,884,744
Patented May 5, 1959

2,884,744
APPARATUS FOR CONDITIONING MOLTEN GLASS

Joseph R. Monks, Jr., and Arthur B. Swain, Jr., Toledo, Ohio, assignors to Owens-Illinois Glass Company, a corporation of Ohio Application February 23, 1956, Serial No. 567,339

1 Claim. (Cl. 49—54)

The present invention is an apparatus for conditioning molten glass preparatory to delivering measured mold charges of the same to the molds of ware forming machines by means of a flow feeder. It is conventional procedure to melt raw batch materials in the melting chamber of a furnace and then cause flow of such molten glass to a refiner, the latter being provided with a plurality of so-called forehearth extensions or "feeder boots" which function to deliver mold charges of the glass to the forming molds, by gravity.

Glass furnaces are formed of refractory blocks which are subject to erosion by the moving glass. As a consequence, the refined glass about to enter the "feeder boot" is often unduly enriched with localized concentrations of alumina, zirconia, etc., the precise form of the enrichment being dependent upon and varying with the composition of the refractory blocks. The inhomogeneities present in the glass, due to such erosion, frequently travel therewith into and through the "feeder boot" and ordinarily exist therein as visible, highly viscous lumps, or stria. Bottles and jars formed from such glass are seriously defective and unmarketable. In the trade, the resultant defects which manifest themselves in the finished glassware are commonly referred to as "mare's tails" or "cat-scratches," such being a rather accurate description of their actual appearance to the naked eye.

An object for our invention is the provision of simple effective means for overcoming the above noted objections and to that end so completely admixing the lumps or stria and the molten glass so as to avoid the creation of any "appearance" defects in the ware.

A further object of our invention is the provision of means for effecting agitation of the molten glass in the refiner at the point of entry of such glass into the "feeder boot," so that there can be no inhomogeneities in the glass as it flows through the "feeder boot" and delivery outlet therein to the forming machine molds.

It is also an object of our invention to introduce gas bubbles into the molten glass through a plurality of conduits which extend vertically upward through the refiner floor at points in very close proximity to the entrance to each "feeder boot" and to so place these conduits in relation to each other as to produce a vertically disposed curtain-like zone whose length substantially equals the width of the forehearth.

In patents to H. A. Shadduck, No. 2,331,052 issued October 5, 1943, and J. W. Wright, No. 2,387,222, issued October 16, 1945, both owned by the assignee of the present application, there is disclosed "bubbling means" designed to refine molten glass. In neither of these, however, has the patentee either recognized the existence of the problem stated above, or disclosed apparatus which is capable of overcoming the indicated deficiencies.

Other objects will be in part apparent and in part pointed out hereinafter.

In the drawings:

Fig. 1 is a fragmentary sectional plan view showing a refining chamber and immediately associated parts with groups of bubble forming conduits in the refiner chamber and each group arranged in a generally arcuate pattern in very close proximity to the inlet end of a "feeder boot."

Fig. 2 is a fragmentary perspective view with parts in section, illustrating the gas bubble forming means and with the conduits arranged in a straight line transverse to the axis of the "feeder boot" inlet.

In the illustrated embodiment of our invention, it is shown incorporated in a more or less conventional form of glass furnace including a melting section 10 and a refining chamber 11 which is separated from the melting chamber by the usual bridge wall 12, said refining chamber, in the form shown, having a generally arcuate nose 13, the side wall of which is formed with several horizontal outlet openings 14 leading to conventional "feeder boots" 15, or forehearth extensions. The floor 16 of the refining chamber 11 is at a level somewhat below the lower side of the outlet openings 14.

As has been pointed out in some detail in the foregoing description, an all important feature of our invention is the provision of means for preventing entry of lumps or particles of the refractory block materials as such into the "feeder boots." Once they have moved into the "feeder boot" with the molten glass, it then is too late to effectively disperse them in the mass of flowing glass and to prevent their appearance in the finished articles of glassware, as has already been explained. It is also of the utmost importance that the means for breaking up and dispersing such lumps of materials be placed as near as possible to the points at which the glass actually leaves the refiner, so that any such materials as would otherwise flow into the "feeder boots" from those areas below and between the side outlet openings 14 will, of necessity, be subjected to agitation and consequently become completely dispersed in the mass of molten glass and result in the creation of a completely homogeneous mass.

For the purpose of obtaining the results indicated above, we introduce gas in the form of bubbles at a prescribed though variable rate, through conduits 17, which as shown, extend upwardly through the floor 16 at points in very close proximity to the wall 13 in which the outlet openings 14 are formed. These conduits 17 may well be of the form and mounted in the fashion shown in the patent to Wright, above identified. These conduits may vary in number and be arranged either in a straight line (Fig. 2), extending transverse to the length of the forehearth extension or "feeder boot" or in a generally arcuate pattern as shown in Fig. 1. In either event, the conduits are so positioned relative to each other and to the side opening 14 as to provide a vertical curtain-like zone of upwardly moving glass which will insure the above described complete dispersion of the lumps and particles of refractory materials. Moreover, the conduits are so distributed as to create a zone of upwardly moving glass which, in length, is substantially equal to the width of the corresponding "feeder boot."

For the purpose of supplying air or gas under pressure to the conduits 17, or bubbler tubes, the latter are connected to a source of air or gas under pressure (not shown) by means of a plurality of pipes 18 leading to a corresponding number of constant pressure differential regulators 19, the latter being carried by a manifold 20. This manifold is connected through a pipeline 21 and suitable filters 22 to a reserve air tank 23, the latter in turn being directly connected by means of a pipe 24 to the supply source. Pressure regulators 25 may be arranged in the pipelines at opposite sides of the reserve air tank 23. With this arrangement, it is obvious that any suitable gas may be utilized to produce the bubbles which cause agitation of the glass and dispersal of the lumps of refractory material, etc., and that the pressure and rate of flow may be regulably controlled to determine, for example, the number of bubbles per minute and therefore the intensity of the agitating or mixing action.

Modifications may be resorted to within the spirit and scope of the appended claim.

We claim:

In glass melting, refining and delivering apparatus, a melting section, a refining chamber, a transverse vertical bridge-wall between the melting section and refining chamber, said refining chamber comprising a floor and side walls, at least one of the side walls being formed with an outlet opening for the discharge of refined molten glass, a forehearth extension communicating with the refining chamber by way of said outlet opening, means for effecting localized agitation of the glass along and in very close proximity to that portion of the side wall substantially at the entrance to the outlet opening comprising a plurality of conduits opening upwardly through the floor and spaced apart in a direction transverse to the length of the forehearth extension and means for delivering and regulably controlling the flow of gas under pressure to the conduits.

References Cited in the file of this patent

UNITED STATES PATENTS

| | | |
|---|---|---|
| 2,026,287 | Stenhouse | Dec. 31, 1935 |
| 2,063,842 | Honiss | Dec. 8, 1936 |
| 2,115,408 | Brosse | Apr. 26, 1938 |
| 2,263,549 | Peyches | Nov. 18, 1941 |
| 2,331,052 | Shadduck | Oct. 5, 1943 |
| 2,387,222 | Wright | Oct. 16, 1945 |
| 2,710,306 | Penberthy | June 7, 1955 |

FOREIGN PATENTS

| | | |
|---|---|---|
| 486,200 | Germany | Oct. 31, 1929 |